United States Patent
Chantriaux et al.

(10) Patent No.: US 9,810,224 B2
(45) Date of Patent: Nov. 7, 2017

(54) ELECTROMAGNETIC POWER TRANSMISSION FOR A ROTARY-WING AIRCRAFT OR A FIXED-WING AIRCRAFT

(76) Inventors: Eric Chantriaux, Venelles (FR); Pascal Chretien, Karana Downs (AU)

(*) Notice: Subject to any disclaimer, the term of this patent is extended or adjusted under 35 U.S.C. 154(b) by 32 days.

(21) Appl. No.: 14/342,406

(22) PCT Filed: Aug. 17, 2012

(86) PCT No.: PCT/AU2012/000968
§ 371 (c)(1),
(2), (4) Date: Mar. 3, 2014

(87) PCT Pub. No.: WO2013/029085
PCT Pub. Date: Mar. 7, 2013

(65) Prior Publication Data
US 2014/0248168 A1 Sep. 4, 2014

(30) Foreign Application Priority Data
Apr. 9, 2011 (FR) ...................................... 11 57828

(51) Int. Cl.
*B64C 27/14* (2006.01)
*B64C 27/24* (2006.01)
(Continued)

(52) U.S. Cl.
CPC ............. *F04D 13/06* (2013.01); *B64C 27/14* (2013.01); *B64D 27/24* (2013.01); *B64D 35/08* (2013.01);
(Continued)

(58) Field of Classification Search
CPC .. H02K 16/00; B64C 27/14; B64C 2201/042; B64D 27/24; Y02T 50/64
See application file for complete search history.

(56) References Cited

U.S. PATENT DOCUMENTS 5,054,716 A 10/1991 Wilson
2006/0113933 A1 6/2006 Blanding et al.
(Continued)

FOREIGN PATENT DOCUMENTS

CA 2230270 10/1999
DE 20 2008 002249 4/2008
(Continued)

OTHER PUBLICATIONS

EP 1863154 A2 Dec. 5, 2007 Potter et al.
International Search Report, dated Oct. 3, 2012, from International Phase of the instant application.

*Primary Examiner* — Brian M O'Hara
(74) *Attorney, Agent, or Firm* — Pearl Cohen Zedek Latzer Baratz LLP (57) ABSTRACT

Rotary-wing aircraft or fixed-wing aircraft consisting of one or a plurality of rotors and/or one or a plurality of airscrews being caused to rotate by means of at least one shaft, the said aircraft comprising a distributed electric motor unit configured to ensure the propulsion and/or the lifting of the said aircraft by causing the said shaft to rotate, the motor unit being a distributed electric motor unit connected directly to the rotating shaft, no mechanism for the transmission of movement being interposed between the said unit and the said shaft, the distributed electric motor unit being composed of a plurality of stacked electric motor elements, each said electric motor element being connected directly to the rotating shaft and consisting of at least one fixed stator and at least one moving rotor capable of connection to the said rotating shaft in order to transmit to it a mechanical power of the following kind where: ·Pr=the nominal mechanical power necessary for the propulsion and/or for the lifting of the said aircraft, ·Pim=the maximum mechanical power capable of being delivered by the electric motor element on level i, to the rotating shaft, for instance Pim<Pr, ·Ki=the
(Continued)

power derating of the electric motor element on level i, for instance $0 \leq k_i \leq 1$, $K_i$ being a variable that is adjustable as a function of the undamaged number of electric motor elements and/or as a function of the nominal mechanical power necessary for the propulsion and/or for the lifting of the said aircraft at a moment in time t, n=the number of electric motor elements comprising the distributed electric, motor unit, for instance $n \geq 2$,—the axes of rotation of the moving rotors and of the rotating shaft being coaxial.

14 Claims, 4 Drawing Sheets

(51) Int. Cl.
  *F04D 13/06* (2006.01)
  *B64D 27/24* (2006.01)
  *B64D 35/08* (2006.01)
  *B64D 35/02* (2006.01)

(52) U.S. Cl.
  CPC ........ *B64C 2201/042* (2013.01); *B64D 35/02* (2013.01); *B64D 2221/00* (2013.01); *Y02T 50/44* (2013.01); *Y02T 50/64* (2013.01)

(56) References Cited

U.S. PATENT DOCUMENTS

2009/0145998 A1\* 6/2009 Salyer ................ B64C 27/04
  244/17.23
2010/0090553 A1\* 4/2010 Ritchey ................ H02K 16/00
  310/114

FOREIGN PATENT DOCUMENTS

DE  10 2008 014404  10/2009
KR  20040018612  3/2004

\* cited by examiner

ELECTROMAGNETIC POWER TRANSMISSION FOR A ROTARY-WING AIRCRAFT OR A FIXED-WING AIRCRAFT

This application is a National Phase Application of PCT International Application No. PCT/AU2012/000968, filed Aug. 17, 2012, published on Mar. 7, 2013 as International Publication No. WO 2013/029085, which in turn claims priority from French Application No. 1157828 filed on Sep. 4, 2011, all of which are incorporated herein by reference.

DESCRIPTION

Technical Field of the Invention

The present invention is directed to a rotary-wing aircraft or a fixed-wing aircraft equipped with a distributed electric motor unit composed of a stack of electric motor elements, each producing a fraction of the total power necessary for the setting in rotation of a rotor shaft.

The invention relates to the technical field of electromagnetic power transmissions applied to aircraft having fixed wings (aeroplanes) or rotary wings (helicopters), regardless of whether these are piloted or not (for example: drones).

State of the Art

Traditional propulsion systems for aircraft generally consist of a thermal engine or turbo shaft engines or turbo-fan engines and a mechanical reduction gear coupled to the rotor shaft. The reduction gears are currently used:

- in helicopters, for transmitting the mechanical torque produced by the one or more engines or turbo shaft engines driving the one or more rotors (main or rear rotor). This brings about a shift from a high speed of rotation (typically 30,000 r/min for a turbine) to a low speed on the rotor shaft (in the range between 500 and 300 r/min for ordinary helicopters).
- in aeroplanes, the engines or turbo shaft engines driving the airscrews (or rotors).

It should be noted that the mechanical transmission gearboxes that are installed in modern machines are supposed to be capable of withstanding 30 minutes of flight without lubrication in the event of fracture of the casing, on condition that flying takes place at reduced power, which in the best case involves aborting the mission and, in unfortunately frequent cases, the loss of the aircraft and its crew as a consequence of the premature disintegration of the mechanical assemblies in flight. The ability to withstand ballistic impacts is fundamental in the field of operations. In summary, the aircraft and its crew may be lost in the event of the failure of the mechanical reduction gear. As a general rule, the resulting consequences are dramatic.

Previously disclosed in patent document CA 2.230.270 (MARTEL) is a multi-motorized shaft permitting a plurality of engines to be used in a single aircraft. Each engine is capable of producing the whole of the total power necessary for the propulsion of the aircraft. This device permits the remaining engine to be used in the event of the breakdown of one of the engines. The output shaft from each engine is offset from the airscrew shaft, however, and a complex system of pulleys and clutches ensures the transfer of energy. Not only does this system of propulsion necessitate a relatively large physical size, because the engine assembly is over-dimensioned for the envisaged redundancy, but it also does not offer optimal safety in the event of the failure of the pulleys and the clutches.

Patent document KR 2004.0018612 (KOREA AEROSPACE) describes a propulsion system permitting the reactivity of the machine to be improved by detecting the status of the said system rapidly and accurately with a propulsion controller. This system includes: an energy generation unit; a generator; a pack of batteries; two electric motors operated by a driver. The electric motors are not included in a distributed architecture, in which each one produces a fraction of the total power necessary for the propulsion of the aircraft, each of the said motors being entirely independent. Here again, this propulsion system does not offer optimal safety in the event of the failure of one of the motors.

Patent document US 2009/0145998 (SALYER) describes a hybrid propulsion system for aircraft, and in particular for helicopters. This system includes: an energy generation unit; a generator; an electric motor, the rotor of which is coaxial with the main rotor of the helicopter; a pack of batteries capable on their own of supplying the electric motor. The safety of the aircraft would no longer be adequately assured in the event of the failure of the electric motor.

Patent document U.S. Pat. No. 5,054,716 (WILSON) describes a propulsion system for aircraft of the "tilt rotor" type. A separate motor is associated with each of the rotors. A transmission mechanism permits the rotors to be connected to one another in such a way that, in the event of the failure of, one of the motors, the remaining motor will be capable of transmitting the mechanical energy to the two rotors. The safety of the aircraft would no longer be assured, however, in the event of the failure of the transmission mechanism.

Document DE 10 2008 014404 (SWISS UAV GMBH) discloses an aircraft without a human pilot comprising a power plant of hybrid design. An internal combustion engine drives an alternator generating an electric current. The latter supplies an electric motor providing the primary power plant and/or buffer batteries. The electric motor may also be supplied with the current provided by the buffer batteries. A transmission mechanism composed of a clutch and a 90° angular gear unit is interposed between the shaft of the electric motor and the rotating shaft of the rotor. The safety of the aircraft would no longer be assured in the event of the failure of this transmission mechanism.

Document DE 20 2008 002249 U1 (DILL HANS DIETER) also discloses an aircraft comprising a power plant of hybrid design (electric motor and internal combustion engine). A transmission mechanism composed of gear wheels is interposed between the shaft of the electric motor and the rotating shaft of the rotor. The safety of the aircraft would no longer be assured in the event of the failure of this transmission mechanism.

A reference herein to a patent document or other matter which is given as prior art is not to be taken as an admission that that document or matter was known or that the information it contains was part of the common general knowledge as at the priority date of any of the claims.

Given this situation, an aspect of this invention is to increase the reliability of the transmission assembly, while reducing its physical size, weight and maintenance costs.

DISCLOSURE OF THE INVENTION

According to an aspect of the present invention there is provided a rotary-wing aircraft or a fixed-wing aircraft consisting of one or a plurality of rotors and/or one or a plurality of airscrews, the one or more rotors, and/or the one or more airscrews being caused to rotate at a variable or constant speed by means of at least one shaft, the said aircraft comprising a distributed electric motor unit configured to ensure the propulsion and/or the lifting of the said aircraft by causing the said shaft to rotate, wherein:

the motor unit is a distributed electric motor unit connected directly to the rotating shaft, no mechanism for the transmission of movement being interposed between the said unit and the said shaft, the distributed electric motor unit is composed of a plurality of stacked electric motor elements, each said electric motor element being connected directly to the rotating shaft and consisting of at least one fixed stator (St) and at least one moving rotor capable of connection to the said rotating shaft in order to transmit to it a mechanical power of the following kind:

$$Pr = \sum_{i=1}^{n} Ki \cdot Pim$$

where:

Pr represents the nominal mechanical power necessary for the propulsion and/or for the lifting of the said aircraft, Pim represents the maximum mechanical power capable of being delivered by the electric motor element on level i, to the rotating shaft, for instance Pim<Pr, Ki represents the power derating of the electric motor element on level i, for instance $0 \leq ki \leq 1$, Ki being a variable that is adjustable as a function of the undamaged number of electric motor elements and/or as a function of the nominal mechanical power necessary for the propulsion and/or for the lifting of the said aircraft at a moment in time t, n represents the number of electric motor elements comprising the distributed electric motor unit, for instance $n \geq 2$, the axes of rotation of the moving rotors and of the rotating shaft are coaxial.

Given that the distributed electric motor unit is in direct connection with the rotating shaft, the transmission mechanisms used until now are completely eliminated, and in particular any form of angular gear unit or gearing between the motor element and the rotating shaft or the airscrew, thereby reducing the physical size in relation to the motor units that are familiar from the prior art and increasing considerably the reliability of the transmission chain. Furthermore, the stacked architecture of the electric motor elements makes it possible, in the event of damage being caused to one of the said elements, to continue to transmit sufficient power to the rotating shaft in complete safety by reassigning the power supplied by the undamaged electric motor elements. Similarly, the judicious dimensioning of the electric motor elements avoids all over-dimensioning and permits the achievement of an optimal power-to-weight ratio. The ability to withstand ballistic impacts is fundamental in the field of operations, and the invention offers this improvement.

The electric motor elements are preferably dimensioned in such a way that the minimum number "Nmin" of the said elements that are together capable of delivering the nominal mechanical power necessary for the propulsion and/or for the lifting of the said aircraft is, for instance, $Nmin \geq 2$.

An electronic control unit is preferably associated with a means for the continuous control of the integrity of each electric motor element, in such a way that, in the event of the failure of one or a plurality of initially active electric motor elements, the electronic control unit will emit a set point, intended for the other undamaged electric motor elements, enabling the power delivered by each of the said undamaged electric motor elements to be reconfigured in a linear fashion in real time by modifying the variable "Ki" in such a way that the distributed electric motor unit continues to transmit to the rotating shaft a level of power that is sufficient for the propulsion and/or the lifting of the said aircraft.

All or part of the electric motor elements can be dimensioned so that each delivers a different maximum mechanical power Pim to the rotating shaft, the power derating factors Ki being different for each of the said electric motor elements.

In a variant embodiment, all of the electric motor elements are dimensioned so that each delivers an identical maximum mechanical power Pim to the rotating shaft, the power derating factors Ki being identical for each of the said electric motor elements.

The electric motor elements are preferably physically separated and insulated one from the other, each electric motor element being inserted into a dedicated housing.

According to a further advantageous characteristic of the invention, the stack of electric motor elements consists of a number of fixed stators that is different from or equal to the number of moving rotors.

In an advantageous manner, the aircraft consists of:

an energy generation unit intended to produce electrical energy, the said unit being associated with a means for distributing the said energy, a means for storing the electrical energy produced by the generation unit, the distributed electric motor unit being supplied with electrical energy via a power controller:

by the means for storing electrical energy, and/or by the generation unit.

The means for storing electrical energy may be composed advantageously of a pack of batteries and/or supercondensers, and/or of any other means.

The electrical energy generation unit is preferably composed of a thermo-chemical generator, or a thermoelectric generator, or a radio isotopic generator, or fuel cells, or a turbo shaft engine or an internal combustion engine equipped with an internal linear or rotating generator or operating an external generator.

An electronic control unit is advantageously configured to control the operating point of the distributed electric motor unit as a function of the power requirement of the said aircraft.

The aircraft may consist of an electronic control unit configured to control the supply to the distributed electric motor unit, the said control unit comprising a program containing:

instructions for supplying the distributed electric motor unit uniquely with the electrical energy produced by the generation unit, instructions for supplying the distributed electric motor unit uniquely with the electrical energy stored in the storage means, instructions for supplying the distributed electric motor unit by combining the electrical energy produced by the generation unit with the electrical energy stored in the storage means.

According to yet another advantageous characteristic of the invention, the aircraft may consist of:

a means for controlling the operational status of the generation unit, an electronic control unit configured to control the supply to the distributed electric motor unit, the said control unit comprising a program containing the instructions for supplying the said distributed electric motor unit uniquely with the electrical energy stored in the storage means, in the event of the failure of the generation unit.

The aircraft may also comprise an electronic control unit configured to control the supply of the distributed electric motor unit, the said control unit comprising a program containing instructions for supplying the said electric motor unit uniquely with the electrical energy stored in the storage means and, where appropriate, instructions for simultaneously stopping the function of the generation unit. This is particularly advantageous in order to suppress any infrared signature of the aircraft.

DESCRIPTION OF THE FIGURES

Other advantages and characteristics of the invention will be more readily appreciated by reading the following description of a preferred embodiment, with reference to the accompanying drawings, which are provided by way of example only and are not intended to be restrictive, in which.

In the Figures, the double arrows represent the power, and the single arrows represent the exchanged data.

EMBODIMENTS OF THE INVENTION

The propulsion device according to the invention is applicable primarily to redundant distributed electric propulsion, when applied to aircraft having rotary wings (helicopters) or fixed wings (aeroplanes), regardless of whether they are piloted or not (drones), consisting of one or a plurality of airscrews and/or one or a plurality of rotors that are caused to rotate by at least one shaft.

Figure 1:
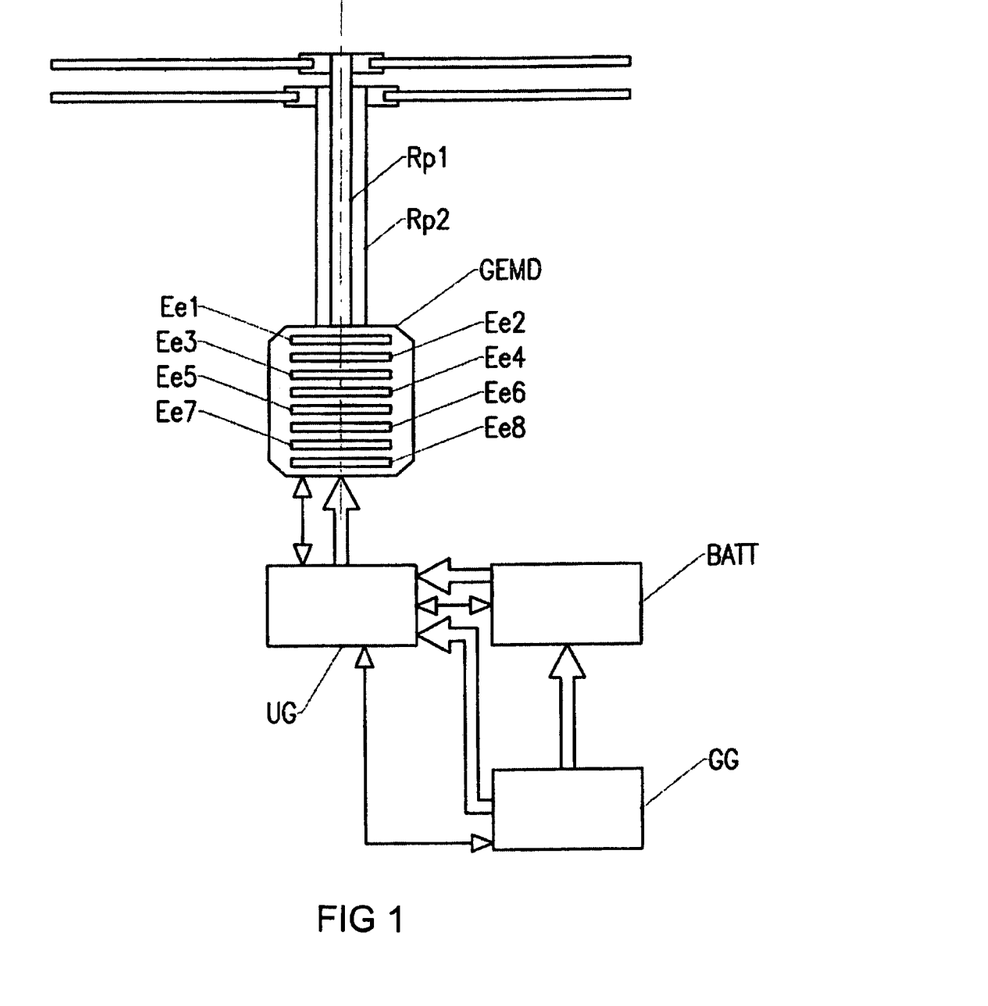
FIG. 1 depicts the arrangement of the propulsion device according to the invention for distributed propulsion in a helicopter with coaxial rotors.
Figure 2:
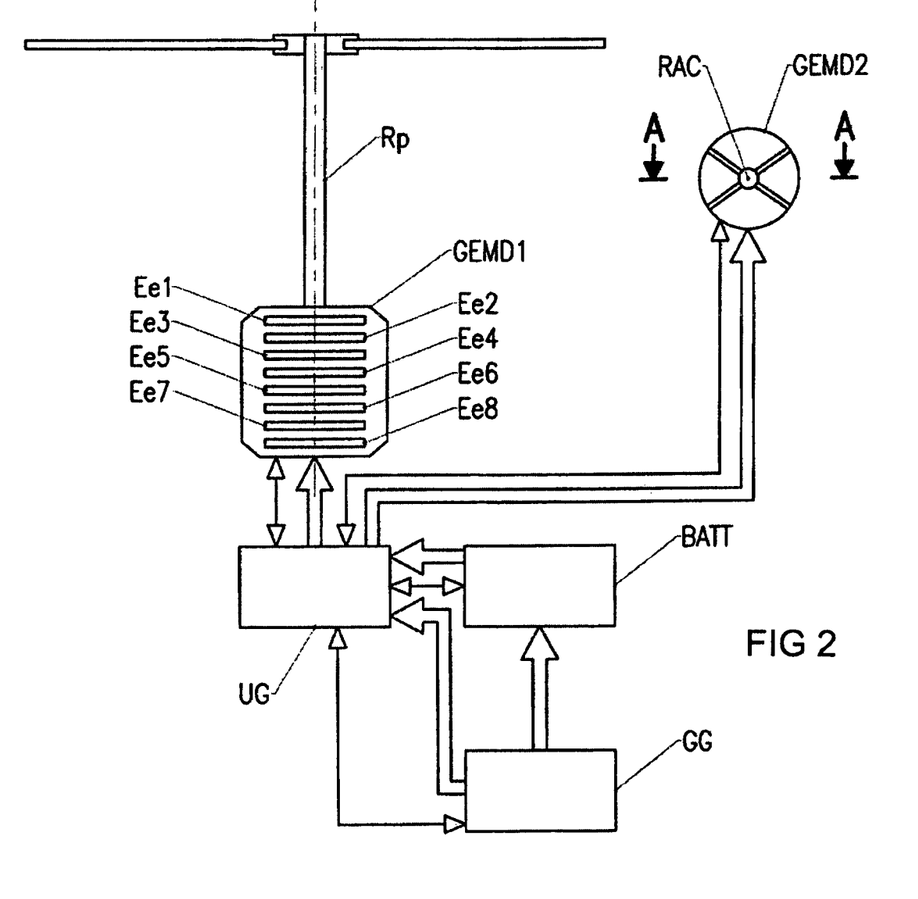
FIG. 2 depicts the arrangement of two propulsion devices according to the invention for distributed propulsion on the main rotor and the anti-torque tail rotor of a conventional helicopter.
Figure 3:
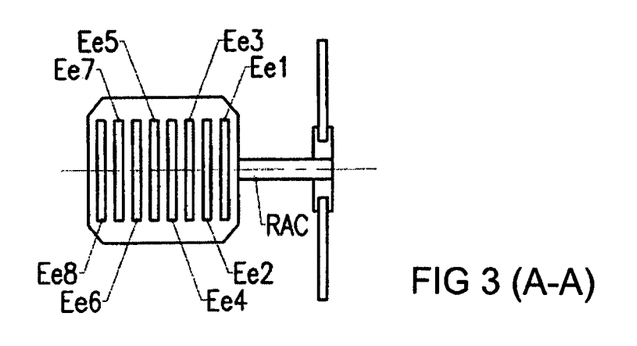
FIG. 3 is a sectioned view according to A-A showing the arrangement of the distributed electric motor unit at the level of the anti-torque tail rotor of the helicopter in FIG. 2.
Figure 4:
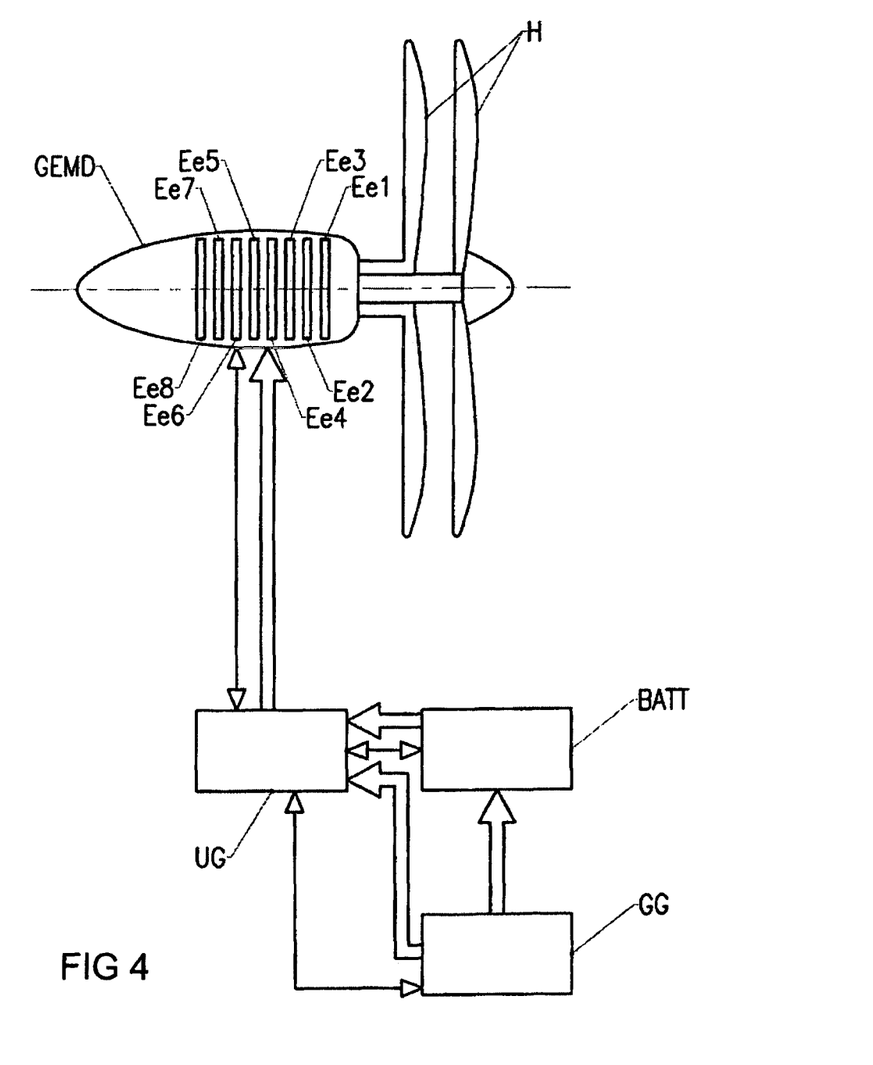
FIG. 4 depicts the arrangement of the propulsion device according to the invention for a distributed propulsion in a fixed-wing aircraft.

According to the invention, a motor unit GEMD causes at least one rotor shaft to rotate at a variable or constant speed. In the example shown in FIG. 1, the motor unit GEMD causes two coaxial rotors Rp1, Rp2 of a helicopter to rotate. In the example shown in FIGS. 2 and 3, a motor unit GEMD1 causes the main rotor Rp of a helicopter to rotate, and another motor unit GEMD2 causes the anti-torque tail rotor (RAC) to rotate. In the example shown in FIG. 4, the motor unit GEMD causes the shafts on which coaxial airscrews H are mounted to rotate.

According to the invention, the motor unit GEMD is a distributed electric motor, unit, that is to say it consists of a plurality of unitary electric motor elements Ee1, Ee2, . . . , Een, each being capable of producing a fraction of the total power necessary for causing the shaft Rp1, Rp2, Rp, RAC, H to rotate. The expression "electric motor element" is used in the context of the present invention to denote an entity capable of transforming electrical energy into mechanical energy. For example, this may be an electric motor integrating into its structure a fixed part (stator) and a moving part (rotor+freewheel). In practice, the stators contain windings, and the rotors contain a plurality of magnetic poles. In order to optimize the physical size and the weight of the distributed electric motor unit GEMD, the number of fixed parts (stator) may be different from or equal to the number of moving parts (rotor+freewheel). The distributed electric motor unit GEMD for coaxial rotors or airscrews of the kind shown in FIGS. 1 and 4 may, for example, consist of electric motor elements each sharing common stators and two rotors with outputs on coaxial shafts.

Figure 5:
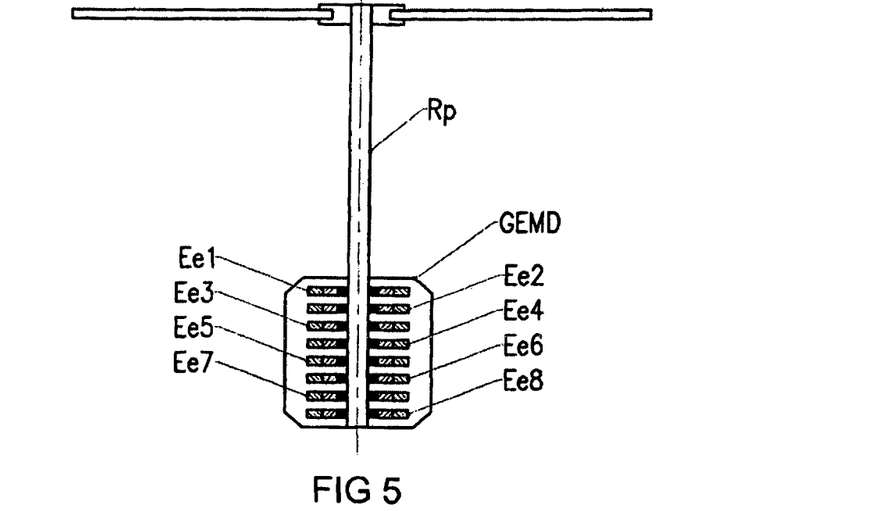
FIG. 5 depicts the connection of the distributed electric motor unit according to the invention on the main rotor of a conventional helicopter.

The electric motor elements Ee1, Ee2, . . . , Een are stacked parallel one above the other (FIGS. 1 and 2), or side by side (FIGS. 3 and 4), in such a way as to obtain a multi-stage assembly. With particular reference to FIG. 5, these electric motor elements Ee1, Ee2, . . . , Een are integrated directly into the structure of the electric motor group GEMD. The latter is in direct contact with the rotating shaft Rp1, Rp2, Rp, RAC, H, and no mechanism for the transmission of movement, in particular any form of angular gear unit or gearing, is interposed between the said unit and the said shaft.

Figure 6:
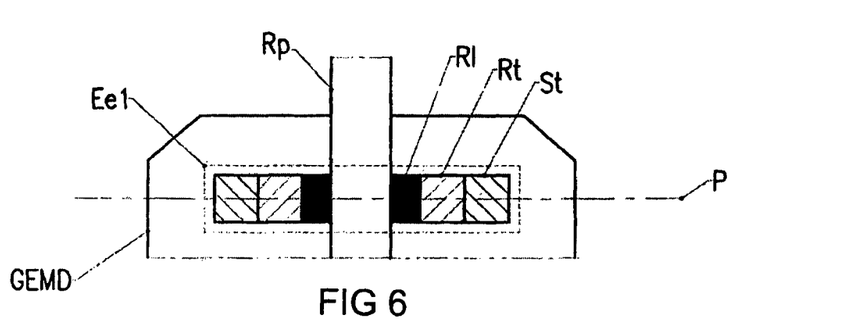
FIG. 6 is a view on an enlarged scale of FIG. 5 detailing one architecture of an electric motor element according to the invention.
Figure 7:
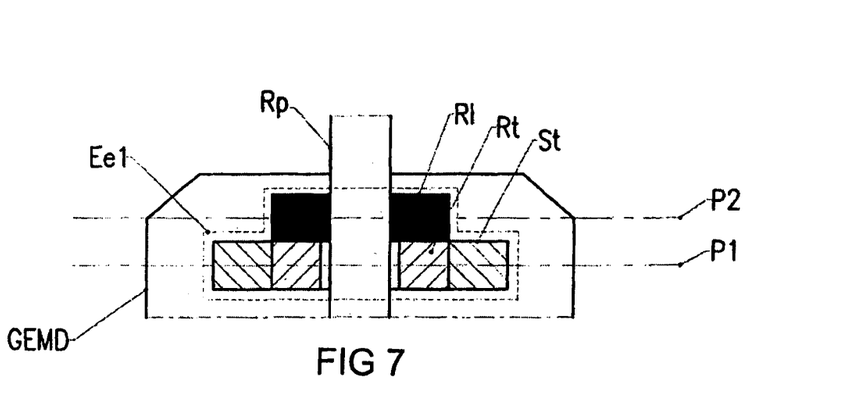
FIG. 7 is a view on an enlarged scale of FIG. 5 detailing another architecture of an electric motor element according to the invention.

With reference to FIGS. 5 to 7, each electric motor element Ee1, Ee2, . . . , Een is connected directly to the rotating shaft Rp1, Rp2, Rp, RAC, H and consists of at least one fixed stator St and at least one moving rotor Rt capable of being connected to the said rotating shaft in order to transmit mechanical power to it. Each electric motor element Ee1, Ee2, . . . , Een preferably comprises at least one mechanical or electromagnetic freewheel R1. The latter is advantageously integrated directly into the structure of the electric motor elements Ee1, Ee2, . . . , Een. The freewheels R1 are thus not, arranged outside the distributed electric motor unit GEMD, but are integrated directly into the latter, thereby reducing its physical size.

Each freewheel R1 consists of one part in direct contact with the moving rotor Rt and one part in direct contact with the rotating shaft Rp1, Rp2, Rp, RAC, H. In the case of a mechanical freewheel, pawls, rolling elements or cams permit the temporary interruption of the rotating drive of the rotating shaft Rp1, Rp2, Rp, RAC, H, which can nevertheless continue to rotate freely. An electromagnetic freewheel consists of an induction motor which, in the absence of electric excitation, permits the temporary interruption of the rotating drive of the rotating shaft Rp1, Rp2, Rp, RAC, H, while providing it with the possibility of rotating freely.

In normal operation, each moving rotor Rt is thus capable of cooperating with a freewheel R1 in such a way as to be connected to the rotating shaft Rp1, Rp2, Rp, RAC, H, in order to transmit the mechanical, power to it. On the other hand, in the event of the failure of an electric motor element Ee1, Ee2, . . . , Een, the freewheel R1 disconnects the rotor Rt from the rotating shaft Rp1, Rp2, Rp, RAC, H. This is particularly advantageous in the case of a short circuit in a winding of the stator St that is capable of bringing about the very violent inductive braking of the rotor.

The freewheels R1 may be situated in the same plane P as the moving rotor Rt with which they are associated (FIG. 6) or situated in another plane P1 parallel to the plane P2 of the said rotor (FIG. 7). In the first case, the longitudinal physical size of the electric motor unit GEMD is reduced. In the second case, the radial physical size of the electric motor unit GEMD is reduced.

In the accompanying Figures, the distributed electric motor unit GEMD is composed of eight electric motor elements (n=8), although a larger or smaller number may be provided as a function of the total power which must be produced and/or as a function of the unit power output of each element. The total generated power may vary from several kilowatts (for example, in order to cause a tail rotor to rotate) to several thousands of kilowatts (for example, in order to cause the system of propulsion of an aeroplane with coaxial airscrews and/or rotors to rotate).

In order to avoid any over-dimensioning of the electric motor unit GEMD, which would have a detrimental effect by increasing the payload carried in the aircraft, the electric motor elements are not able under any circumstances to provide only the power necessary for the propulsion and/or for the lifting of the said aircraft. On the other hand, each electric motor element Ee1, Ee2, ..., Een produces, on the rotating shaft Rp1, Rp2, Rp, RAC, H, a mechanical power of the following kind:

$$Pr = \Sigma_{i=1}^{n} Ki \cdot Pim$$

where:

Pr represents the nominal mechanical power necessary for the propulsion and/or for the lifting of the said aircraft, Pim represents the maximum mechanical power capable of being delivered by the electric motor element on level i, to the rotating shaft Rp1, Rp2, Rp, RAC, H, for instance Pim<Pr, Ki represents the power derating of the electric motor element on level i, for instance $0 \leq ki \leq 1$, Ki being a variable that is adjustable as a function of the valid number of electric motor elements and/or as a function of the nominal mechanical power Pr necessary for the propulsion and/or for the lifting of the said aircraft at a moment in time t, n represents the number of undamaged electric motor elements comprising, the distributed electric motor unit GEMD, for instance $n \geq 2$, and preferably n=5, the vibrations being severely limited in the electric motor unit for this number of electric motor elements.

More specifically, the electric motor elements Ee1, Ee2, ..., Een are dimensioned in such a way that the minimum number "Nmin" of the said elements that are together capable of delivering the nominal mechanical power Pr necessary for the propulsion and/or for the lifting of the said aircraft is, for instance, $Nmin \geq 2$. However, an electric motor element is incapable on its own of supplying the nominal mechanical power Pr in a manner that is consistent with the weight and power constraints required by an aircraft.

All or part of the electric motor elements Ee1, Ee2, ..., Een may each be dimensioned to deliver a different maximum mechanical power Pim to the rotating shaft Rp1, Rp2, Rp, RAC, H. It is possible, for example, to arrange those electric motor elements that are capable of delivering the highest levels of mechanical power at one extremity of the electric motor unit GEMD, and to arrange those electric motor elements delivering the lowest levels of mechanical power at the other extremity. This "conical" configuration ensures better cooling of the electric motor elements Ee1, Ee2, ..., Een. In this case, the power derating factors Ki are different for each of the said electric motor elements Ee1, Ee2, ..., Een.

All of the electric motor elements can each be dimensioned, however, to deliver an identical maximum mechanical power Pim to the rotating shaft Rp1, Rp2, Rp, RAC, H. A "cylindrical" configuration is then obtained, in which the distribution of the mechanical power is homogeneous on the rotating shaft Rp1, Rp2, Rp, RAC, H. In this case, the derating factors Ki are identical for each of the said electric motor elements.

The maximum power PM capable of being produced on the rotating shaft Rp1, Rp2, Rp, RAC, H is:

$$PM = \Sigma_{i=1}^{n} Pim$$

The margin of power $P_f (>1)$ is expressed in the form of:

$$P_f = \frac{P_{1m} + P_{2m} + P_{3m} + P_{4m} + \ldots + P_{nm}}{k_1 \cdot P_{1m} + k_2 \cdot P_{2m} + k_3 \cdot P_{3m} + k_4 \cdot P_{4m} + \ldots + k_n \cdot P_{nm}}$$

For the specific case in which all the electric motor elements Ee1, Ee2, ..., Een are identical, given that $K1 = K2 = \ldots = Kn = K$, we obtain:

$$P_f = \frac{1}{k}$$

The maximum number "Nm" of electric motor elements Ee1, Ee2, ... Een that are able to fail without a reduction in the nominal power Pr on the rotating shaft Rp1, Rp2, Rp, RAC, H is:

$$N_m = \frac{(P_{1m} + P_{2m} + P_{3m} + P_{4m} + \ldots + P_{nm}) - k \cdot (P_{1m} + P_{2m} - P_{3m} + P_{4m} + \ldots + P_{nm})}{P_{nm}}$$

$$= \frac{P_f \cdot (P_f - 1)}{P_{nm}}$$

where Nm is a natural integer other than zero.

The electric motor elements Ee1, Ee2, ..., Een may be physically separated and insulated (mechanical segregation) and/or electrically separated and insulated (electrical segregation) one from the other. For mechanical segregation, each electric motor element may, for example, be inserted into a dedicated housing (or box or "casing" in English). For electrical segregation, it is possible to provide, for example, one or a plurality of discrete windings on the same ferromagnetic core. This type of segregation, for example, offers the distributed electric motor unit GEMD a certain resilience to the effects of subsequent damage caused by fires capable of affecting an electric motor element.

The distributed electric motor unit GEMD is controlled by an electronic control unit UG. The latter consists of a more or less complex electronics system, typically equipped with one or a plurality of digital or analogue processors configured to execute one or more programs, sub-programs, microprograms or all other equivalent types of software, in order to control the operation of the distributed electric motor unit GEMD and, in a more general manner, that of the device that is the object of the invention. In particular, the control unit UG permits the electric motor elements Ee1, Ee2, ..., Een to be synchronized with one another.

The control unit UG is preferably associated with a means for the continuous control, of the integrity of each electric motor element Ee1, Ee2, ..., Een. The means of control may, for example, consist of a set of sensors integrated in an intrinsic manner into each electric motor element and, for example, configured to detect the rotation and the angle of the rotor, the supply of electricity to the stator, the torque and/or the generated power; etc. In the event of the failure of one or a plurality of initially active electric motor elements Ee1, Ee2, . . . , Een, the control unit UG is thus configured to emit a set point enabling the power delivered jointly by all of the said elements to be reconfigured in real time. For example, during normal operation, only one part of the electric motor elements (for example: Ee1 to Ee6) may be sufficient to transmit the necessary power to the rotating shaft Rp1, Rp2, Rp, RAC, H. In the event of the failure of electric motor elements (for example: Ee5 and Ee6), the control unit UG instantaneously brings into service other reserve electric motor elements (for example: Ee7 and Ee8) in order to enable the distributed electric motor unit GEMD to continue to transmit sufficient power to the rotating shaft Rp1, Rp2, Rp, RAC, H.

In the event of the failure of one or a plurality of initially active electric motor elements Ee1, Ee2, . . . , Een, the control unit UG is preferably configured to emit a set point, intended for the other undamaged electric motor elements, enabling the power delivered by each of the said undamaged electric motor elements to be reconfigured in a linear fashion in real time by modifying the variable "Ki" in such a way that the distributed electric motor unit GEMD continues to transmit sufficient power to the rotating shaft Rp1, Rp2, Rp, RAC, H. For example, in normal operation, all of the electric motor elements (for example: Ee1 to Ee8) each provide a fraction of their maximum power in such a way that the distributed electric motor unit transmits nominal power to the rotating shaft Rp1, Rp2, Rp, RAC, H. In the event of the failure of electric motor elements (for example: Ee5 and Ee6), the control unit UG reconfigures the power delivered by each electric motor element that is still undamaged (for example: Ee1, Ee2, Ee3, Ee4, Ee7 and Ee8) by increasing the derating value Ki in order to enable the distributed electric motor unit GEMD to continue to transmit sufficient power to the rotating shaft Rp1, Rp2, Rp, RAC, H. In the event of eight electric motor elements having been brought into service initially, and in the event of the failure of two electric motor elements, the remaining six undamaged electric motor elements will deliver 1.33 times the power that they would have supplied prior to the failure.

Furthermore, it is possible to modulate the distribution of the power on each electric motor element Ee1, Ee2, . . . , Een in order to optimize the thermal performance and the thermal dissipation. The electric motor elements Ee1, Ee2, . . . , Een are not necessarily all of the same size, and they do not necessarily supply the same power.

The electric motor unit GEMD thus has a structure which is distributed, redundant, self-adjusting and, in the case of aircraft, configurable in flight, thereby providing high resilience to multiple failures and to the effects of subsequent damage caused by multiple ballistic impacts or by fires.

The control unit UG controls the operating point of the distributed electric motor unit GEMD as a function of the power requirement of the aircraft. In particular, the control unit UG can cause the torque or the speed of rotation of each electric motor element Ee1, Ee2, . . . , Een to vary as a function of the power requirement of the aircraft. For example, in the event of the failure of electric motor elements, and if no other reserve electric motor element is available, the control unit UG can emit a set point in order to increase the torque or the speed of rotation of those electric motor elements that are still in service, in order to enable the distributed electric motor unit GEMD to continue to transmit sufficient power to the rotating shaft Rp1, Rp2, Rp, RAC, H.

With reference to the accompanying Figures, the aircraft comprises an electrical energy generation unit GG that is used to produce electrical energy. This generation unit GG may be composed of a thermo-chemical generator, a thermoelectric generator (Peltier or other), a radio isotopic (nuclear) generator, fuel cells, a turbo shaft engine or an internal combustion engine equipped with an internal electrical generator or driving an external generator. Typically, this energy generation unit GG is associated with a means for distributing the electrical energy produced by it. This means may consist of a more or less complex electronics system, controlled as appropriate by the control unit UG.

The electrical energy produced by the generation unit GG may be stored temporarily in a storage means BATT. In practice, the latter may consist of a pack of batteries and/or supercondensers and/or any other similar means, (flywheels on magnetic bearings, for example) having their own system of electronic control and regulation. Supercondensers are condensers with exceptionally high capacities, typically above a hundred or even thousands of Farads. These components owe their existence to recent discoveries of materials with high dielectric constants. Unlike a battery, a supercondenser is able to supply very high intensities very quickly. In the case of a helicopter, during the autorotation phase, the distributed electric motor unit GEMD can function as a generator, thereby permitting the batteries and/or superconductors to be recharged while regulating the speed of rotation of the one or more main rotors Rp1, Rp2, Rp.

A power controller, either integrated or operated by the control unit UG, permits the supply of electrical energy to the distributed electric motor unit GEMD to be controlled. This electrical energy may originate from a storage means BATT and/or from the generation unit GG. The control unit UG is thus configured to manage the supply to the distributed electric motor unit GEMD via the power controller. In practice, the control unit UG comprises a program containing instructions for supplying the distributed electric motor unit GEMD:

either uniquely with the electrical energy produced by the generation unit GG (a part of this electrical energy may or may not be directed simultaneously to the storage means BATT);

either uniquely with the electrical energy stored in the storage means BATT;

or by combining the electrical energy produced by the generation unit GG with the electrical energy stored in the storage means BATT (in order to respond to the transient high demands for power, for example during the take-off phase). This combination leads to a significant reduction in the weight of the propulsion system in relation to a conventional aircraft.

The generation unit GG is preferably associated with a means permitting its operating state to be controlled. In practice, it is in the form of one or a plurality of sensors integrated in the said unit and permitting the continuous control of various operating parameters. If the generation unit GG is faulty or defective as a result of mechanical, incendiary and/or ballistic damage, the control unit GG will instantaneously emit instructions for supplying the distributed electric motor unit GEMD with the electrical energy stored in the storage means BATT. In the case of a helicopter, in the event of failure of the generation unit GG, the energy stored in the storage means BATT may thus permit a powered landing and the possibility of hovering, unlike helicopters equipped with conventional propulsion systems. The resulting engine failure and autorotation is no longer an emergency.

The generation unit GG may generate a certain quantity of heat in certain cases (in particular in the case in which it comprises an internal combustion engine), thereby creating an infrared signature for the aircraft or the engine, which are then detectable by standard methods of spectral analysis. In order to adopt stealth mode (with no infrared signature, an indispensable stealth component in a field of operations), the control unit UG is adapted to emit instructions for supplying the distributed electric motor unit GEMD uniquely with the electrical energy stored in the storage means BATT, and instructions for simultaneously stopping the operation of the generation unit GG.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or component's, or group thereto.

The claims defining the invention are as follows:

1. A propulsion device for rotary-wing aircraft or fixed-wing aircraft comprising a rotor or an airscrew, the rotor or the airscrew being caused to rotate at a variable or constant speed by a rotating shaft, the propulsion device including a distributed electric motor unit, configured to ensure propulsion or lifting of the aircraft by causing the rotating shaft to rotate, wherein:

the electric motor unit includes a plurality of distributed electric motor elements connected directly to the rotating shaft, with no mechanism for the transmission of movement interposed between the motor elements and the shaft, the electric motor elements are physically separated from each other and each of the electric motor elements is inserted into a dedicated housing, the electric motor elements are stacked, each electric motor element comprising at least one fixed stator and at least one moving rotor, said moving rotor being connected to the rotating shaft in order to transmit to said rotating shaft a mechanical power, each undamaged electric motor element producing a fraction of the nominal mechanical power necessary for the propulsion or for the lifting of the aircraft in accordance with the following equation:

$$Pr = \sum_{i=1}^{n} K_i \cdot P_{im}$$

where:
Pr represents the nominal mechanical power necessary for the propulsion or for the lifting of the aircraft, Pim represents the maximum mechanical power capable of being delivered by the undamaged electric motor element on level i, to the rotating shaft, where Pim<Pr, Ki represents the power derating of the undamaged electric motor element on level i, where $0 \leq k_i \leq 1$, Ki being a variable that is adjustable as a function of the undamaged valid number of electric motor elements and as a function of the nominal mechanical power necessary for the propulsion or for the lifting of the aircraft at a moment in time t, and n represents the number of undamaged electric motor elements comprising the distributed electric motor unit, where $n \geq 2$, the axes of rotation of the moving rotors and the rotating shaft being coaxial, and an electronic control unit is configured to continuously control the integrity of each electric motor element, such that, in the event of failure of an electric motor element, the control unit emits a set point, intended for the undamaged electric motor element, enabling the power delivered by each of the undamaged electric motor elements to be reconfigured in a linear fashion in real time by modifying the variable "Ki" such that the distributed electric motor unit continues to transmit to the rotating shaft a level of power that is sufficient for the propulsion of the aircraft.

2. A propulsion device for an aircraft according to claim 1, wherein the electric motor elements are dimensioned such that the minimum number "Nmin" of undamaged electric motor elements that are together capable of delivering the nominal mechanical power necessary for propulsion or lifting of the aircraft is Nmin≥2.

3. A propulsion device for an aircraft according to claim 1, wherein some of the electric motor elements are dimensioned to deliver a different maximum mechanical power Pim to the rotating shaft, the power derating factors Ki being different for each of the electric motor elements.

4. A propulsion device for an aircraft according to claim 1, wherein all of the electric motor elements are dimensioned to deliver a different maximum mechanical power Pim to the rotating shaft, the power derating factors Ki being different for each of the electric motor elements.

5. A propulsion device for an aircraft according to claim 1, wherein the stacked electric motor elements includes a number of fixed stators that is different from the number of moving rotors.

6. A propulsion device for an aircraft according to claim 1, wherein the stacked electric motor elements includes a number of fixed stators that is equal to the number of moving rotors.

7. A propulsion device for an aircraft according to claim 1, comprising:
an energy generation unit intended to produce electrical energy, the energy generation unit being associated with a means for distributing the energy,
a means for storing the electrical energy produced by the generation unit,
the distributed electric motor unit being supplied with electrical energy via a power controller integrated in or operated by an electronic control unit:
by the means for storing electrical energy,
or by the energy generation unit.

8. A propulsion device for an aircraft according to claim 7, wherein the means for storing electrical energy is composed of a pack of batteries or super-capacitors.

9. A propulsion device for an aircraft according to claim 7, wherein the electrical energy generation unit is composed of one of the following:
a thermo-chemical generator,
a thermoelectric generator,
a radio isotopic generator,
fuel cells,
a turbo shaft engine, or an internal combustion engine equipped with an internal generator or driving an external generator.

10. A propulsion device for an aircraft according to claim 7, wherein the electronic control unit is configured to control the operating point of the distributed electric motor unit as a function of the power requirement of the aircraft.

11. A propulsion device for an aircraft according to claim 7, wherein the electronic control unit is configured to control the supply to the distributed electric motor unit, the electronic control unit comprising a program containing:

instructions for supplying the distributed electric motor unit uniquely with the electrical energy produced by the energy generation unit, instructions for supplying the distributed electric motor unit uniquely with the electrical energy stored in the storage means, instructions for supplying the distributed electric motor unit by combining the electrical energy produced by the energy generation unit with the electrical energy stored in the storage means.

12. A propulsion device for an aircraft according to claim 7, comprising:
a means for controlling the operational status of the energy generation unit,
the electronic control unit being configured to control the supply to the distributed electric motor unit, the electronic control unit comprising a program containing instructions for supplying the distributed electric motor unit uniquely with the electrical energy stored in the storage means, in the event of the failure of the energy generation unit.

13. A propulsion device for an aircraft according to claim 7, wherein the electronic control unit is configured to control the supply to the distributed electric motor unit, the electronic control unit comprising a program containing instructions for supplying the electric motor unit uniquely with the electrical energy stored in the storage means, and instructions for simultaneously stopping the function of the energy generation unit.

14. A propulsion device for a helicopter comprising a rotor or an airscrew, the rotor or the airscrew being caused to rotate at a constant speed by a rotating shaft, the propulsion device including a distributed electric motor unit, configured to ensure propulsion, or lifting of the aircraft by causing the rotating shaft to rotate, wherein:
the electric motor unit includes a plurality of distributed electric motor elements connected directly to the rotating shaft, with no mechanism for the transmission of movement interposed between the motor elements and the shaft,
the electric motor elements are physically separated from each other and each of the electric motor elements is inserted into a dedicated housing,
the electric motor elements are stacked, each electric motor element comprising at least one fixed stator and at least one moving rotor, said moving rotor being connected to the rotating shaft in order to transmit to said rotating shaft a mechanical power,
each undamaged electric motor element producing a fraction of the nominal mechanical power necessary for the propulsion or for the lifting of the helicopter in accordance with the following equation:

$$Pr = \Sigma_{t=1}^{n} K_i \cdot P_{im}$$

where:
Pr represents the nominal mechanical power necessary for the propulsion or for the lifting of the helicopter, Pim represents the maximum mechanical power capable of being delivered by the undamaged electric motor element on level i, to the rotating shaft, where $Pim < Pr$, Ki represents the power derating of the undamaged electric motor element on level i, where $0 \leq ki \leq I$, Ki being a variable that is adjustable as a function of the undamaged valid number of electric motor elements and as a function of the nominal mechanical power necessary for the propulsion or for the lifting of the helicopter at a moment in time t, and n represents the number of undamaged electric motor elements comprising the distributed electric motor unit, where $n \geq 2$, the axes of rotation of the moving rotors and the rotating shaft being coaxial; and an electronic control unit is configured to continuously control the integrity of each electric motor element, such that, in the event of failure of an electric motor element, the control unit emits a set point, intended for the undamaged electric motor element, enabling the power delivered by each of the undamaged electric motor elements to be reconfigured in a linear fashion in real time by modifying the variable "Ki" such that the distributed electric motor unit continues to transmit to the rotating shaft a level of power that is sufficient for the propulsion or the lifting of the helicopter.

* * * * *